United States Patent
Duchon et al.

(10) Patent No.: US 8,180,777 B2
(45) Date of Patent: *May 15, 2012

(54) METHOD AND SYSTEM TO COMPARE DATA OBJECTS

(75) Inventors: Andrew Duchon, Somerville, MA (US);
Kari Kelton, Louisville, KY (US);
Pacey Foster, Cambridge, MA (US);
Kara Orvis, San Marcos, CA (US);
Robert McCormack, Somerville, MA (US)

(73) Assignee: Aptima, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/910,823

(22) Filed: Oct. 24, 2010

(65) Prior Publication Data

US 2011/0040764 A1 Feb. 17, 2011

Related U.S. Application Data

(63) Continuation-in-part of application No. 12/014,750, filed on Jan. 15, 2008, now Pat. No. 7,822,750.

(60) Provisional application No. 61/264,272, filed on Nov. 25, 2009, provisional application No. 60/885,401, filed on Jan. 17, 2007.

(51) Int. Cl.
*G06F 7/00* (2006.01)
*G06F 17/30* (2006.01)

(52) U.S. Cl. . 707/738; 707/739; 707/771; 707/E17.089; 707/E17.098; 706/45; 706/46; 706/52; 706/54

(58) Field of Classification Search ............... 707/738, 707/739, 771, 794, E17.089, E17.098; 706/45, 706/46, 52, 54
See application file for complete search history.

(56) References Cited

U.S. PATENT DOCUMENTS

| | | | |
|---|---|---|---|
| 6,496,812 B1 | 12/2002 | Campaigne et al. | |
| 6,728,695 B1 * | 4/2004 | Pathria et al. | 707/999.002 |
| 7,177,851 B2 | 2/2007 | Afeyan et al. | |
| 7,693,808 B2 * | 4/2010 | Tingling | 706/45 |
| 7,822,750 B2 * | 10/2010 | Duchon et al. | 707/738 |
| 2003/0182631 A1 * | 9/2003 | Tsochantaridis et al. | 715/531 |
| 2004/0083195 A1 | 4/2004 | McCord et al. | |

(Continued)

OTHER PUBLICATIONS

Getoor et al.—"A Letent Dirichlet Model for Unsupervised Entity Resolution"—SIAM International Conference on Data Mining 2006 (pp. 47-58).*
Vitus S. W. Lam—"Equivalences of BPMN Processes"—Computer Center, The University of Hong Kong, Springer-Verlag, London Limited 2009, vol. 2, No. 3, Aug. 13, 2009 (pp. 189-204:1-16).*

(Continued)

*Primary Examiner* — John E Breene
*Assistant Examiner* — Anh Ly
(74) *Attorney, Agent, or Firm* — John J. Brooks, III

(57) ABSTRACT

The present invention relates in general to methods and systems for comparing and maximizing the optimal selection of a first set of one or more data objects to a set of second data objects. In one embodiment, the first set of data objects represent one or more tasks to be fulfilled by a set of capabilities represented by the second data objects. In one embodiment, methods and systems are provided that apply topic modeling and similarity metrics to determine the optimal selection. In one embodiment, methods and systems are provided to determine the appropriateness of a set of second data objects to satisfy the requirements of a first data object given interaction attributes. Embodiments may be used to compare mission requirements with potential team members to determine the appropriateness of team members and teams for a given mission based on interaction attributes of the team members and teams.

19 Claims, 12 Drawing Sheets

U.S. PATENT DOCUMENTS

| | | | |
|---|---|---|---|
| 2005/0114279 A1 | 5/2005 | Scarborough et al. | |
| 2005/0131827 A1* | 6/2005 | Bantz et al. | 705/50 |
| 2005/0273350 A1 | 12/2005 | Scarborough et al. | |
| 2007/0118498 A1* | 5/2007 | Song et al. | 707/1 |
| 2007/0282775 A1* | 12/2007 | Tingling | 706/45 |
| 2008/0140616 A1* | 6/2008 | Encina et al. | 707/3 |
| 2009/0043621 A1 | 2/2009 | Kershaw | |
| 2011/0040764 A1* | 2/2011 | Duchon et al. | 707/738 |

OTHER PUBLICATIONS

Kortuem et al.—"When Peer-to-Peer comes Face-to-Face: Collaborative Peer-to-Peer Computing in Mobile Ad-hoc Networks"—Wearable Computing Group, Aug. 27-29, 2001 (pp. 75-91:1-17).*

Gerd Kortuem—"Proem: A Peer-to-Peer Computing Platform for Mobile Ad-hoc Networks"—University of Oregon, (ru.ac.za) 2001, (pp. 1-6).*

\* cited by examiner

| Employee Information | Data Resource | Description | Format |
|---|---|---|---|
| | Resumes | Resumes for current and past employees with information on skills, past employment, and education | Unstructured text; format varies widely from person to person |
| | Biographies | Short description of employees' current and past work | Unstructured text |
| | Hire Dates | Dates of hire and termination (if applicable) for current and past employees | Structured spreadsheet |
| | Communication Logs | Email, phone and instant messaging logs with info on sender, recipient, date/time, and size/duration (content not gathered or used) | SQL database |

| Project Information | Data Resource | Description | Format |
|---|---|---|---|
| | Timecards | Hours charged by each employee to various projects broken down by month | Structured spreadsheet |
| | Project Information | Summary information on each project including title, dates, customer, budget, and manager | Structured spreadsheet |
| | Proposal Information | Summary information on each proposal including title, dates, customer, and proposal leader | Structured spreadsheet |
| | Request for Proposals (RFP) | Government issued requests with descriptions of desired work | Unstructured text |

FIG. 7

| Symbol | Definition |
|---|---|
| $\Pi$ | The set of all projects. |
| $\tau(\pi)$ | The starting month of project $\pi \in \Pi$. |
| $M$ | The set of all employees. |
| $M^\pi$ | The set of all team members members of project $\pi$. |
| $\Pi_i \subset \Pi$ | The set of all projects for which person $i \in M$ is a member. |
| $\Pi_i^* \subset \Pi_i$ | The set of all projects for which person $i \in M$ has been manager. |
| $E^\pi$ | The set of all emails on project $\pi \in \Pi$. We define a project email to be any email where the sender and all recipients have greater than 0 hours on the project for the given month. |
| $\hat{E}$ | The set of all non-project emails. A non-project email is one in which at least one of either the sender or recipients do not share a common project for that month. |
| $e_i^\pi$ | An email on project $\pi \in \Pi$ with sender $i \in M$ |
| $\hat{e}_i$ | A non-project email from person $i \in M$. |
| $C_i$ | The set of customers with which person $i$ has worked. |
| $P_{\alpha,\beta}()$ | logistic growth function with parameters $\alpha$ and $\beta$, $$\frac{1}{1+e^{-\alpha(t-\beta)}}$$ |

FIG. 9

| Formula | Name/Definition |
|---|---|
| $R(e_i^\pi)$ | Set of recipients <br> The set of all recipients of the given email. |
| $N(e_i^\pi) = \|R(e_i^\pi)\|$ | Number of recipients <br> The number of recipients on the given email. |
| $T^\pi(i,j) = \sum_{e_i^\pi \in E^\pi, j \in R(e_i^\pi)} \dfrac{1}{N(e_i^\pi)}$ | Project email recipient exclusivity <br> For the emails on project $\pi$ for which $i \in M$ is the sender and $j \in M$ is a recipient, sum the inverse of the number of recipients. This is an additive value of the exclusivity of recipient $j$ in emails from $i$. |
| $\tilde{T}^\pi(i,j) = \sum_{e_i^\pi \in E^\pi, j \in R(e_i^\pi)} \dfrac{P_{t(e_i^\pi)}^\pi(i)}{N(e_i^\pi)}$ | Weighted project email recipient exclusivity <br> Similar to $T^\pi(i,j)$, but we weight the measure by the percentage of hours the recipient has on the project during the month that the email was sent. |
| $\hat{T}(i,j) = \sum_{e_i \in \hat{E}, j \in R(e_i)} \dfrac{1}{N(\hat{e}_i)}$ | Non-project email recipient exclusivity <br> For all non-project emails which $i \in M$ is the sender and $j$ is a recipient, sum the inverse of the number of recipients. |
| $F^\pi(i) = \sum_{e_i^\pi \in E^\pi} N(e_i^\pi)$ | Total email recipients <br> For all emails on project $\pi$ sent by $i \in M$ sum the number of recipients of each email. |
| $H_t^\pi(i)$ | Project hours by month <br> The number of hours person $i \in M$ worked on project $\pi$ during month $t$. |
| $P_t^\pi(i)$ | Percentage project hours by month <br> Percentage of labor plan hours person $i$ spent on project $\pi$ in month $t$. |

FIG. 10

| Formula | Name/Definition |
|---|---|
| $S_T^\pi(i,j) = \sum_{t \leq T} \min(H_t^\pi(i), H_t^\pi(j))$ | Previous shared time by project and month The total number of hours persons $i, j \in M$ shared on project $\pi$ prior to time $T$. |
| $S_T(i,j) = \sum_{\pi \in \Pi} S_T^\pi(i,j)$ | Total previous shared time The total number of hours persons $i, j \in M$ shared on any project prior to time $T$. |
| $\Theta(i,j)$ | PLSA employee similarity The similarity between person $i$ and person $j$. This value can be derived in different ways, such as from PLSA. |
| $d(\pi_i, \pi_j)$ | Project topic distance The distance in the topic vector space between project $i$ and project $j$. |
| $W(\pi)$ | Project success score A measure of the projects success; can be derived in many different ways. |

FIG. 11

METHOD AND SYSTEM TO COMPARE DATA OBJECTS

CROSS-REFERENCE TO RELATED APPLICATIONS

This application is a Continuation in Part and claims the benefit of U.S. patent application Ser. No. 12/014,750 filed on Jan. 15, 2008, now U.S. Pat. No. 7,822,750 B2, entitled "Method and System to Compare Data Entities" which claims benefit of U.S. Patent Application No. 60/885,401 filed on Jan. 17, 2007 entitled "METHOD AND SYSTEM TO COMPARE DATA OBJECTS" both of which are herein incorporated by reference in their entirety. This application also claims benefit of U.S. Patent Application No. 61/264,272 filed on Nov. 25, 2009 entitled "METHOD AND SYSTEM TO COMPARE DATA OBJECTS" which is herein incorporated by reference in its entirety.

STATEMENT REGARDING FEDERALLY SPONSORED RESEARCH OR DEVELOPMENT

This invention was made with Government support under Contract #FA8650-06-M-4420 and Contract #FA8650-07-C-4510 both awarded by the U.S. Air Force Research Lab. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates in general to a method and system for comparing and maximizing the appropriateness of a group of entities having capabilities for fulfilling a mission having requirements, where the entities and mission are represented by unstructured data, structured data, and constraints.

Latent Semantic Analysis

Latent Semantic Analysis (LSA) is a theory and method for extracting and representing the contextual-usage meaning of words by mathematical computations (namely singular value decomposition) applied to a large corpus of text. The underlying concept is that the aggregate of all the word contexts in which a given word does and does not appear provides a set of mutual constraints that largely determines the similarity of meaning of words and sets of words to each other.

Probabilistic Latent Semantic Analysis

Probabilistic Latent Semantic Analysis (PLSA) is one of many unsupervised statistical machine-learning techniques that posit latent "topics," a mixture of which is modeled as generating the words in a document. Additionally, the topics themselves are easily interpretable and thus become an explanatory component for visualization, analysis, and allow for spot inspection of performance.

The PLSA model has been shown to be more accurate than LSA for information retrieval (Hofmann, 1999), and has been deployed in legal, medical and publishing domains with large knowledge repositories.

Matching Resumes and Job Descriptions

Both LSA (Laham, et al. 2000) and PLSA (U.S. Pat. No. 6,728,695, Pathria et al., 2004) have been used to match a single entity represented by unstructured and structured data to a mission represented by unstructured and structured data. The entities in these cases were individuals represented by resumes, and the missions were occupations represented by job postings.

However, methods have not been disclosed that utilize LSA or PLSA to determine the appropriateness of a group of entities for accomplishing the goals of a single mission or a multitude of missions.

BRIEF SUMMARY OF THE INVENTION

The present invention relates in general to a method and system for comparing and maximizing the appropriateness of a group of entities having capabilities for fulfilling a mission having requirements, where the entities and mission are represented by unstructured data, structured data, and constraints. More particularly, embodiments of this invention relate to an effective and accurate method and system to compare and maximize the similarity and/or appropriateness between the group's capabilities and the mission's requirements that are contained, even if only-latently, in data sets such as written documents, electronic databases or other repositories of information.

It is an object of one embodiment of the invention to provide a processor-based method for comparing a plurality of data objects comprising the steps of receiving a first data object, receiving a plurality of second data objects, applying a topic model technique to the first data object and the plurality of second data objects creating a topic model, grouping the plurality of second data objects creating a plurality of groupings, determining a similarity of the first data object and the plurality of groupings, determining an optimal selection of the first data object and the plurality of groupings from the similarity and communicating the optimal selection.

In some embodiments of the invention, the topic model technique consists of one of the group of Probabilistic Latent Semantic Analysis (PLSA) and Latent Dirichlet Allocation (LDA).

In some embodiments of the invention, the methods further comprise determining an appropriateness of the first data objects and the second data objects and determining an optimal selection from the similarity and the appropriateness.

It is another object of one embodiment of the invention to provide a processor-based method for comparing a plurality of data objects comprising the steps of receiving a first data object, receiving a plurality of second data objects, applying a topic model technique to the first data object and the plurality of second data objects creating a topic model, grouping the plurality of second data objects creating a plurality of groupings, determining a first similarity of the first data object and the plurality of groupings, determining a second similarity of the plurality of second data objects in each of the plurality of groupings, comparing the first similarity and the second similarity to determine an optimal selection of the first data object and the plurality of groupings and communicating the optimal selection.

In some embodiments of the invention, the data objects comprise a plurality of attributes of a plurality of individuals and at least one of the plurality of attributes comprises an interaction attribute.

It is yet another object of some embodiments of the invention to provide a processor-based method for comparing a plurality of data objects comprising the steps of receiving a first data object representing at least one attribute of a mission, receiving a plurality of second data objects representing at least one attribute of at least one individual, at least one of the second data objects representing an interaction attribute of the individuals, grouping the plurality of second data objects creating a plurality of groupings, determining an appropriateness of the first data object and the plurality of groupings, determining an optimal appropriateness of the first data object and the plurality of groupings and representing the optimal selection.

It is an object of one embodiment of the invention to provide a system for comparing a plurality of data objects comprising means for receiving a first data object, means for receiving a plurality of second data objects, means for applying a topic model technique to the first data object and the plurality of second data objects creating a topic model, means for grouping the plurality of second data objects creating a plurality of groupings, means for determining a similarity of the first data object and the plurality of groupings, means for determining an optimal selection of the first data object and the plurality of groupings from the similarity and means for communicating the optimal selection.

It is another object of an embodiment of the invention to provide a processor-based method for comparing a plurality of data object comprising the steps of receiving a first data object, receiving a plurality of second data objects, applying an interaction measure to the first data object and the plurality of second data objects, grouping the plurality of second data objects creating a plurality of groupings, determining an appropriateness of the first data object and the plurality of groupings, determining an optimal selection of the first data object and the plurality of groupings from the appropriateness and communicating the optimal selection. In some of the embodiments, the plurality of second data objects comprises a plurality of attributes of a plurality of individuals and at least one of the plurality of attributes comprises an interaction attribute.

BRIEF DESCRIPTION OF THE SEVERAL VIEWS OF THE DRAWINGS

FIG. 7 is a tabular representation of an example set of attributes used in one embodiment of the present invention;

FIG. 9 is a tabular representation of an example set of symbols used in one embodiment of the present invention;

FIG. 10 is a tabular representation of an example set of formulas used in one embodiment of the present invention;

FIG. 11 is a tabular representation of another example set of formulas used in one embodiment of the present invention;

DESCRIPTION OF THE INVENTION

Figure 1:
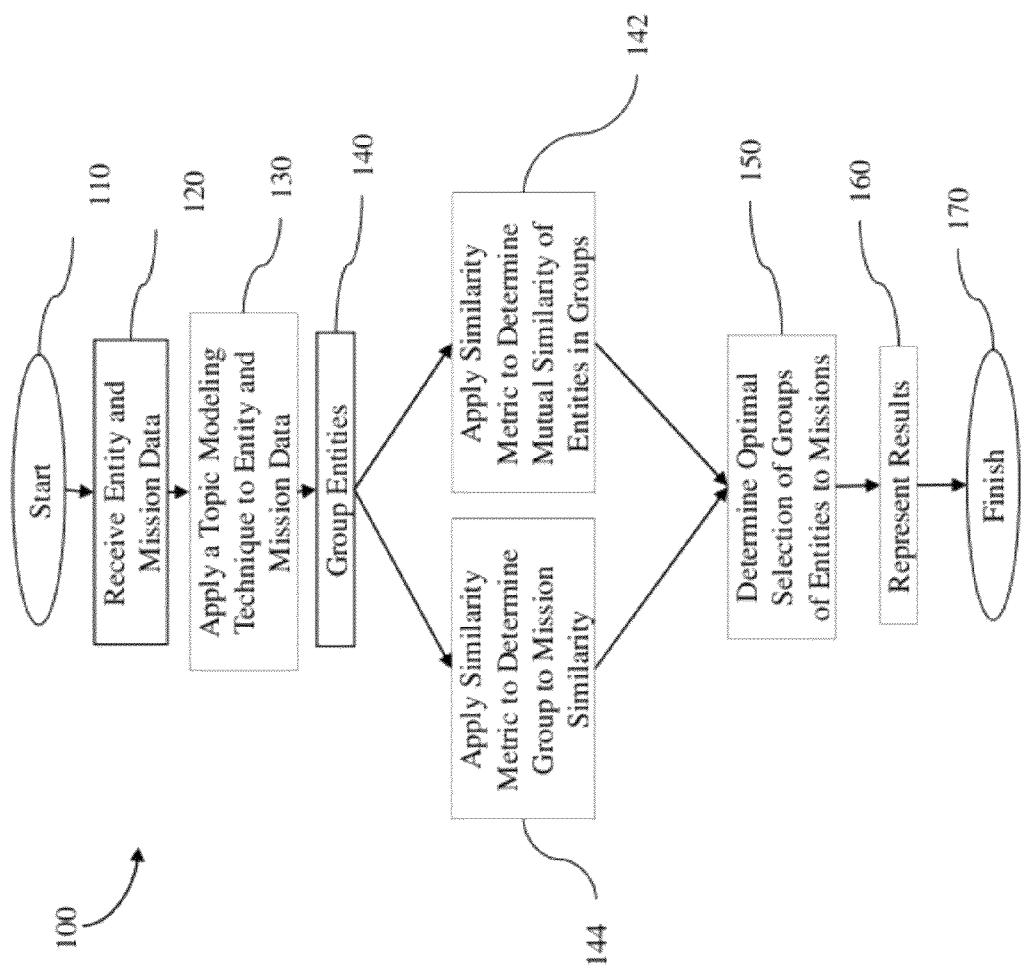
FIG. 1 is a flow diagram of one embodiment of this invention.

The present invention is illustrated by, but by no means limited to, the following description of a preferred embodiment. In particular, the systems and methods will be described as an embodiment of comparing a set of documents representing individual members of a group of people to a set of documents representing a mission to be accomplished by a set of members of that group of people. It is understood, that other embodiments of the invention can be applied to many other data objects. In particular, it is well understood that the systems and methods described can be applied to, but not limited to, electronic data sources such as investment portfolio data, social web sites or audio data sources, such as cell phone transmissions, that can be converted into electronic data sources.

In addition to providing methods to compare and help select a group of entities or whose attributes matched all the requirements of a task, there are other attributes that can help provide insights into providing the best group of entities for a task. In particular, embodiments of this invention relate to situations where the entities are individuals and the task is a mission. Embodiments of this invention provide methods and systems for using team chemistry to compare and help select teams and team members for specific missions, and provide leaders and administrators the ability to use and modify the criteria of assessment and the requirements of missions. In addition to the team members' match to the task requirements of a mission, the ability of the members to work well together impacts the overall success of the mission.

For a given mission, data objects reflecting attributes of that mission may dictate the necessary chemistry a team of individuals must possess in order for that mission to succeed. To illustrate, a mission that is highly time-dependant may require individuals who are familiar with each other in order to "hit the ground running." Likewise, missions that require a high level of creativity and innovation may indicate that a potential team must possess a diverse group of individuals, but also individuals who are not likely to conflict with each other. The attributes of a mission may be determined through analysis of the mission description, expert analysis, or user input. We determine the necessary mix of teamwork skills for a given set of mission attributes based on expert analysis, literature review, and historical data. This mapping of which teamwork skills are required for which mission attribute may be represented as a matrix of weights. That is, each element of the matrix is a numerical value which determines the necessity of a given skill based on the importance of the mission attributes. Mission attributes themselves may be binary (either they are important to the mission or not) or determined on a multi-value scale from not-at-all important to very important. Then, the mix of teamwork skills necessary for a mission may be computed by evaluation of the elements of the matrix.

Throughout this description, the term "data object" is used to describe any individual piece or grouping of data. Examples of data objects include but are not limited to entity data, mission data, attributes, skills, documents, emails, audio files, financial reports, streaming media and photographs, and any analysis of such data objects.

Figure 13:
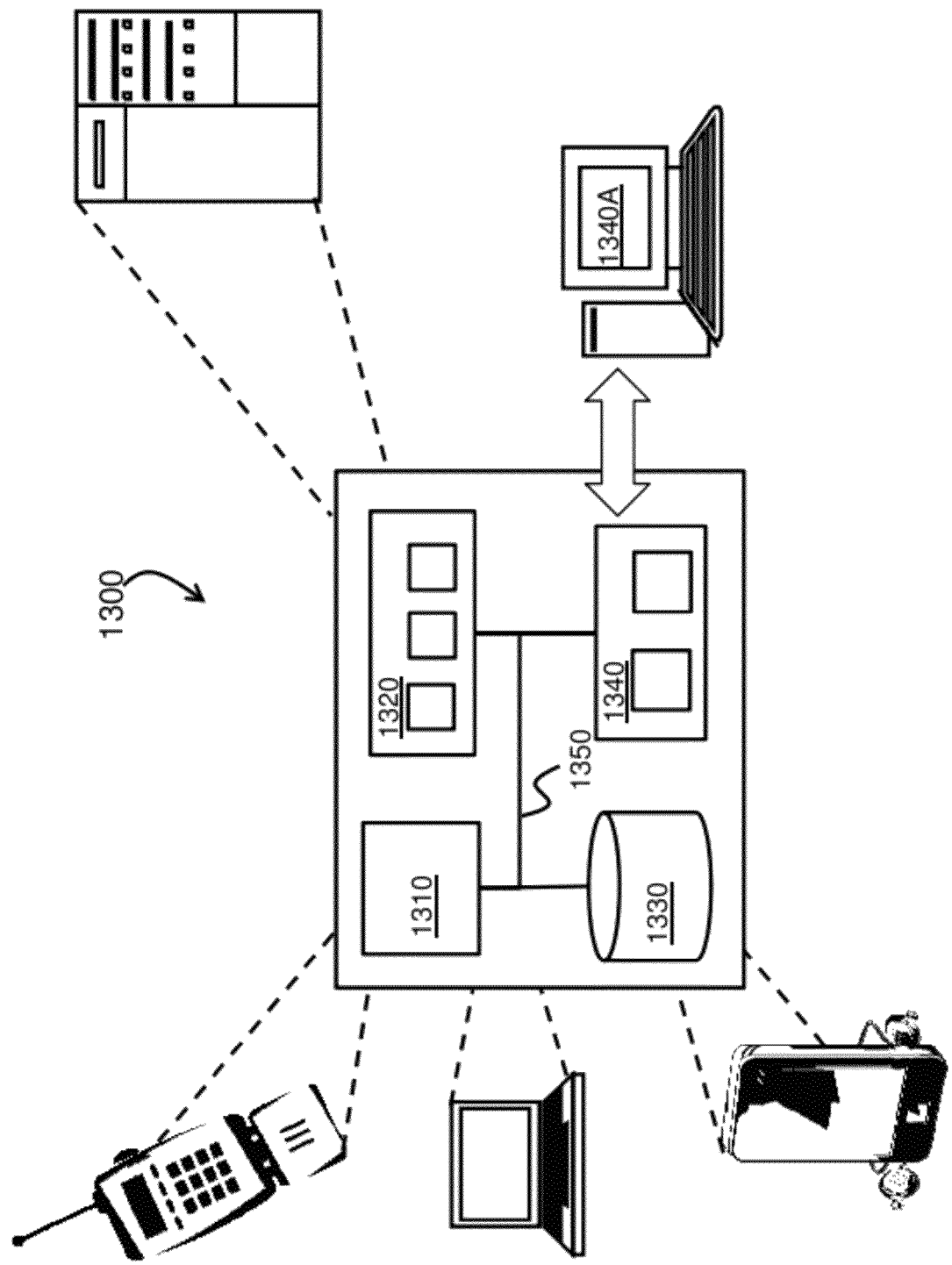
FIG. 13 is a functional diagram of one embodiment of a processor-based system to compare data objects.

The System:

The following discussion provides a brief, general description of a suitable computing environment in which one embodiment of the present invention may be implemented. FIG. 13 and its discussion below provide a more detailed description of one embodiment.

The invention will often be practiced on a single processor-based computing device, but can also be implemented on a client computing device and/or a server or other remote computing device connected by a communication network. The system comprises a processor-based system for enabling a user to compare and maximize the appropriateness of a group of entities having attributes or capabilities for fulfilling a mission having requirements, the processor based system comprising: memory in which are stored machine instructions or computer program product that define a plurality of functions; a display; a user input device for input of data; at least one processor that is coupled to the memory, the display, and the user input device; and said processor executing the computer program product to carry out a plurality of functions.

In the preferred embodiment of this system, the processor accepts user input and executes the computer program product to carry out the plurality of functions, including the methods described below.

Those skilled in the art will appreciate that this invention might also be practiced with other computer system configurations, such as a client device for executing personal productivity tools, including hand-held devices, pocket personal computing devices, other microprocessor-based or programmable consumer electronic devices, multiprocessor systems, network PCs, minicomputers, mainframe computers, and the like. Furthermore, the present invention can also be practiced in distributed computing environments, where tasks are performed by remote processing devices that are linked through a communications network. In a distributed computing environment, machine instructions may be located in both local and remote memory storage devices.

Figure 8:
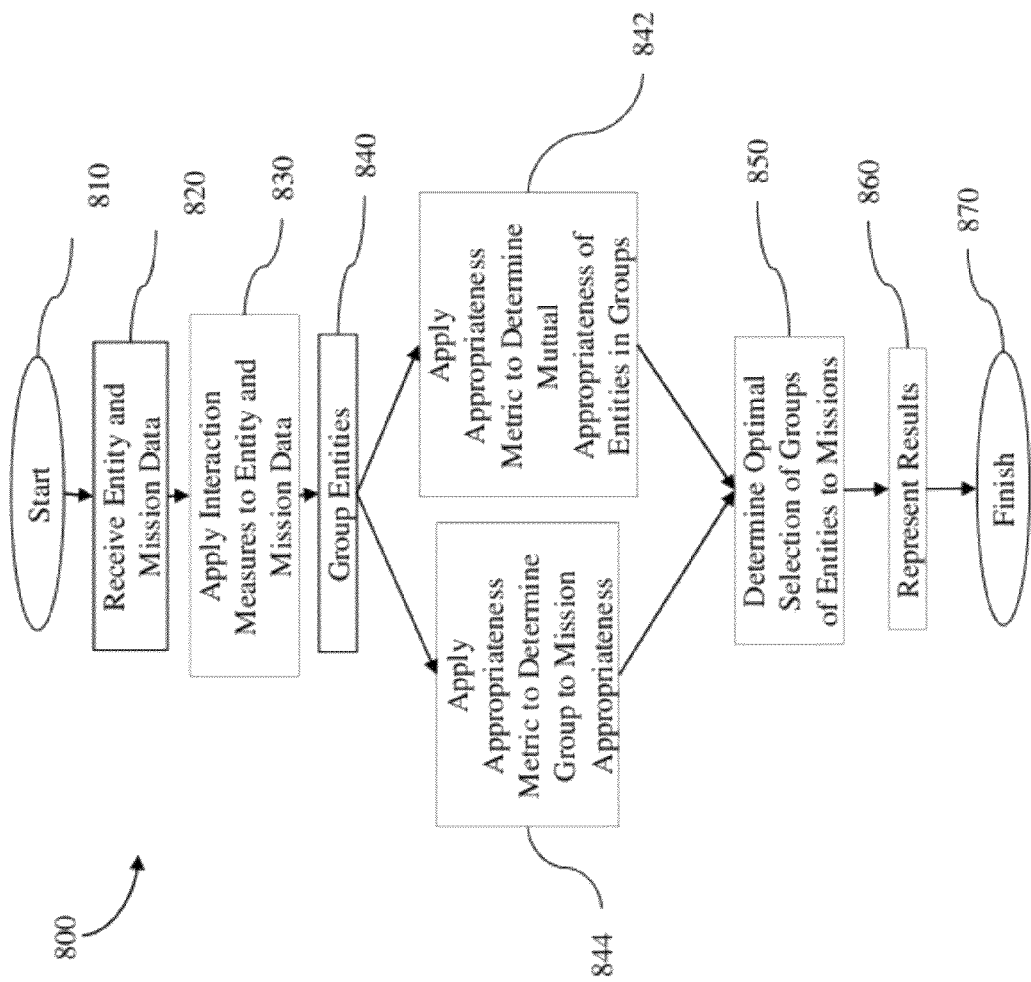
FIG. 8 is a flow diagram of one embodiment of the present invention.
Figure 12:
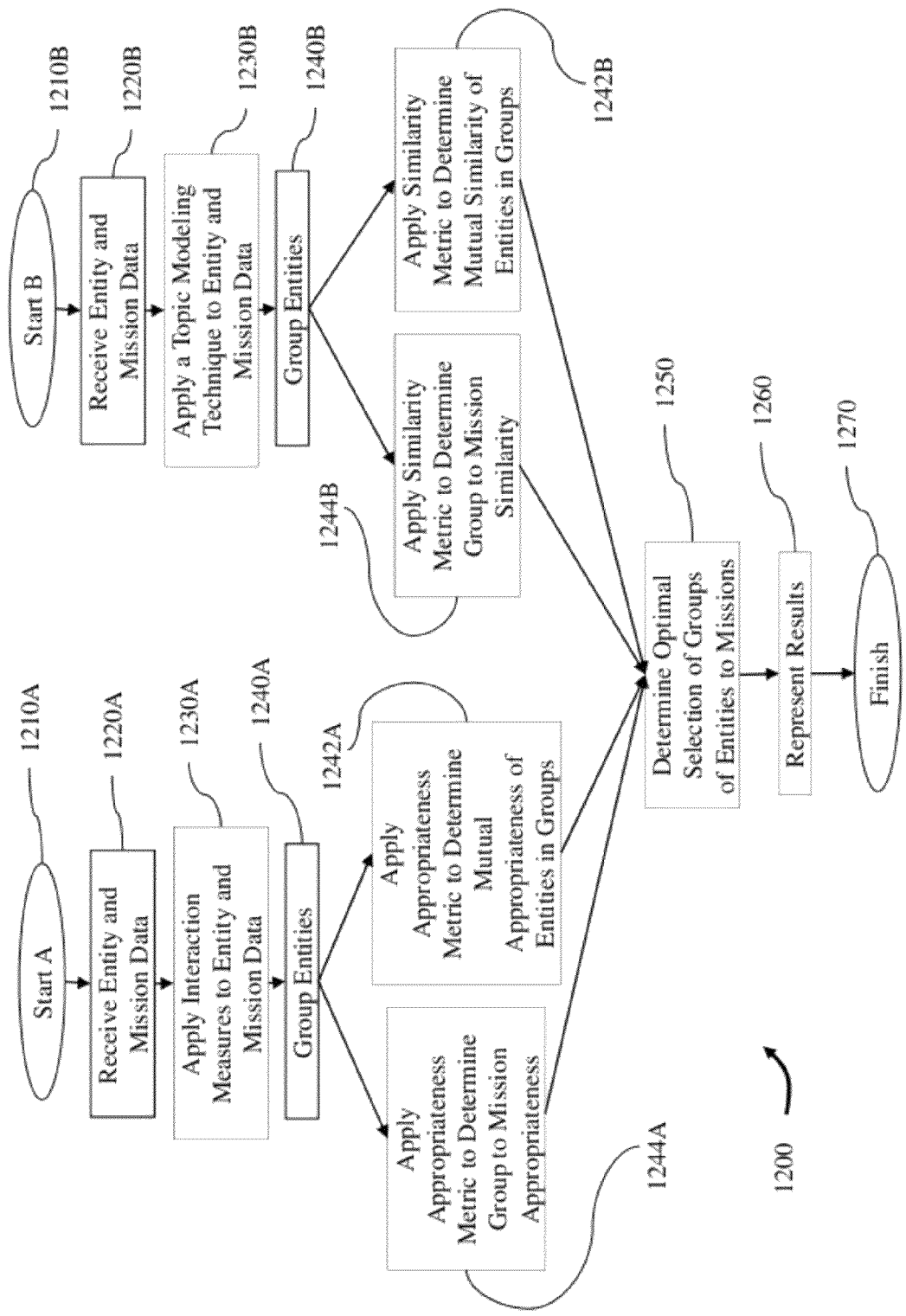
FIG. 12 is a flow diagram of one embodiment of the present invention.

The Methods:

The following steps, as shown in FIGS. 1, 8 and 12, describe embodiments of the methods of the disclosed invention. FIG. 1 illustrates an embodiment of methods of applying topic modeling and similarity metrics to compare data objects. As shown in this figure, the methods of embodiments reflected by FIG. 1 can be performed independently. FIG. 8 illustrates an embodiment of methods to compare data objects with interaction measures and appropriateness measures. It is also understood that the methods of embodiments reflected by FIG. 8 can be performed independently. FIG. 12 illustrates an embodiment incorporating steps of the embodiments in both FIGS. 8 and 12.

FIG. 12 will be used to illustrate the steps of embodiments that combine portions of the methods shown in FIG. 1 and FIG. 8. The description of process steps associated with FIG. 12 can also be used to describe similarly entitled process steps of FIG. 1 and FIG. 8. In FIG. 12, steps 1210A-1244A and steps 1210-1244B are performed in parallel and followed by steps 1250-1270. Embodiments can also include having the same series performed serially followed by the functions performed in steps 1250-1270.

Receiving Data Objects

Referring to FIG. 12, following the start 1210B, step 1220B of the process comprises receiving multiple sets of data objects. In this embodiment, these data objects are textual documents or textual data objects that represent entities and missions and are separated into entity data and mission data respectively.

Figure 2:
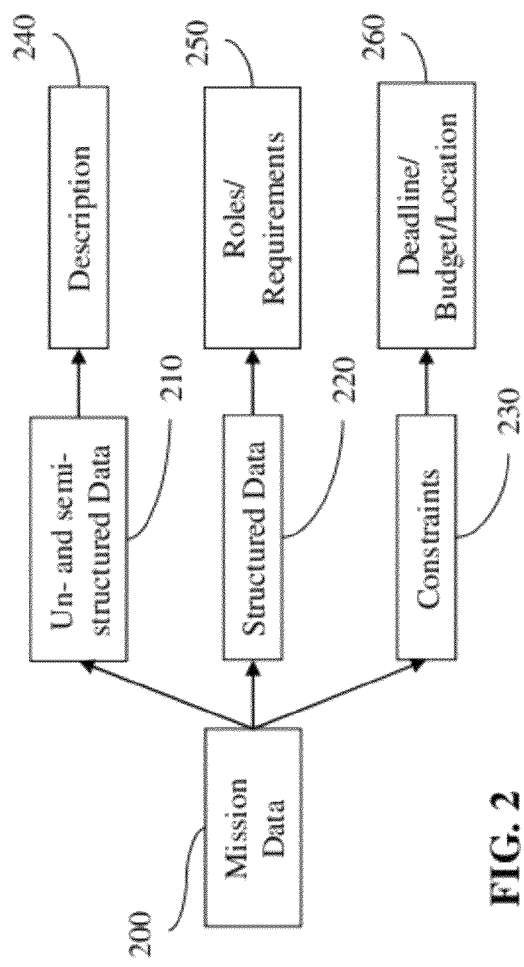
FIG. 2 is a visual depiction of the possible contents of mission data in one embodiment of this invention.

As shown in FIG. 2, a mission can be represented by mission data 200 describing a task or tasks that need to be accomplished, possibly including, when, how and why they must be done. This mission data 200 may take the form of unstructured or semi-structured data 210, structured data 220 as well as a set of constraints 230. The unstructured and semi-structured data 210 for a mission may consist of a written description of what the mission entails. As an example of this embodiment, the unstructured and semi-structured data may be in the form of a request for proposals (RFP) as issued by the Small Business Innovative Research (SBIR) program of the U.S. Government. These RFPs generally consist of text divided into sections (semi-structured data 210) describing the overall objective, a description 240 of the background and technology, and the goals sought in phase I and phase II of the program, the text of which are considered unstructured data 210, though other aspects of these documents can be considered features as described below. A mission might have additional structured data 220 associated with it describing the roles or minimal requirements 250 for the entities participating in the mission. In one embodiment, a company wishing to submit a proposal to the SBIR program might further define structured data 220 for various roles needed to fulfill this mission, and minimal requirements for these roles, such as having a person with a Ph.D. being bid as the primary investigator. A mission may also have constraints 230 associated with it. In one embodiment, these constraints may consist of temporal deadlines, financial budgets, or geographical locations 260, though this does not exclude any number of other possible constraints applied to entities for success of a mission. In one embodiment, these constraints may consist of a certain period of performance in the SBIR program, requiring people to have time available during this period.

Other examples of objects that could be characterized into the mission data type include, but are not limited to, data as may be found in a job posting, tasks in a statement of work, tasks in a mission statement, investment goals for an individual, investment goals for an organization, descriptions of a software program, descriptions of a drug treatment goal or any data object that that can be used to define a set of requirements. In addition, other data objects that are considered to be missions may in fact be entities in a different scenario. For example, to replace an employee who has left the company, all of the documents used to characterize that employee may act as the data for the mission, and a group of one or more other employees then are entities which must fulfill the former employees' duties.

Figure 3:
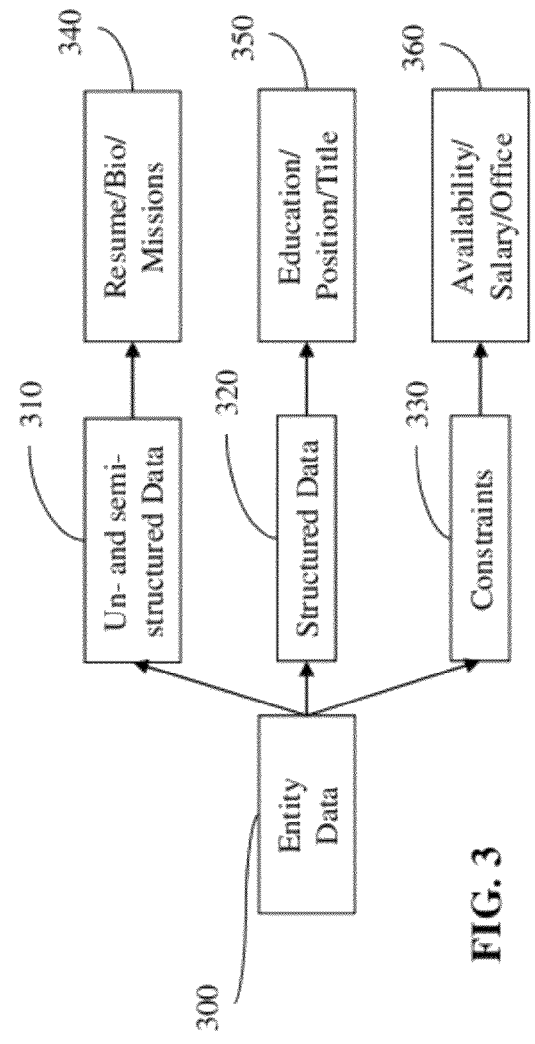
FIG. 3 is a visual depiction of the possible contents of entity data in one embodiment of this intention.

As shown in FIG. 3, an entity can also be defined by entity data 300 that can comprise unstructured and semi-structured data 310, structured data 320 and constraints 330. In one embodiment of the invention, the entity is an employee, and the unstructured and semi-structured data 310 consists of documents 340 describing the employee's work history, such as one or more resumes, biographical descriptions, descriptions of previous jobs or missions (including mission data), or other documents that the employee has generated or consumed, such as books, web-pages, and the like. Entities may also have structured data 320 associated with them. In one embodiment where the entity is an employee, structured data 320 concerning the employee may include education level, courses taken, certificates awarded, years working at the company, current position or title, and other such facts about the employee 350. Entities may also have constraints 330 associated with them. In one embodiment where the entity is an employee, the constraints may comprise availability 360, salary, and ability to travel to other locations.

Other embodiments of entities and their corresponding entity data include, but are not limited to, entities such as pieces of equipment, data relating to pieces of equipment, investment products, the attributes of a particular investment vehicle, the attributes of particular drugs, attributes of software modules or any data object representing elements that can be used to satisfy a set of requirements.

In some embodiments, the entities may include entity data including specific attributes reflecting interaction attributes of the individuals. These attributes may be provided as part of each of the individual data objects or they can be provided as a separate set of data objects. The interaction attributes represent the skills and/or experiences of that entity in working with other entities or other missions/tasks. Examples of sources of that specific type of data are shown in FIG. 7 and include sources of employee data information as well as project information.

Given interaction data, one embodiment of a method of comparing data objects is shown in FIG. 8. This method is similar to the method described for FIG. 1 with the substitution of interaction measures and appropriateness metrics rather than similarity measures. In the embodiment in FIG. 8, the interaction, or teamwork type attributes/skills of individuals may be determined through analysis of archival data. An individual's contribution to the performance of a given mission may be determined, in part, by that individual's history of mission performance and interactions with other team members in the past. Archival data may indicate individual teamwork skills which may include, but are not limited to, communication records (e.g., phone, email, instant messaging), past mission performance scores, publication records, and biographies. To assess the teamwork skills of an individual, we mine the data for indicators of these skills based on experts' definitions of the skills. For example, the teamwork construct of "familiarity" (i.e. how well the team members know each other) can be, in part, assessed through analysis of dyadic communications between each of the members. The teamwork construct of "conflict" (in the sense of cognitive conflict rather than physical conflict) may be assessed through analysis of similarity between individuals based on their biographies or publications (using techniques described below). In addition, we may assess the ability of individuals to manage teams which lack various teamwork skills by analyzing archival data in which an individual led or was a member of a team which lacked certain teamwork skills. For example, if an individual managed a team that was unfamiliar (where familiarity is measured as described earlier), but that team succeeded nonetheless, then we determine that this individual is able to compensate for that lack of familiarity on the team.

Referring back to FIG. 12, one embodiment of incorporating the methods of FIG. 8 are shown as starting with receiving the entity and mission data at step 1220A. In this embodiment, the entity data at least includes data objects reflecting attributes of an entity such as an individual. Some of these attributes may include interaction attributes of the entity.

Apply Topic Modeling Technique

Referring again to FIG. 12, with the data received in step 1220B, a topic model technique is applied to the data 1230B. Topic modeling techniques such as Probabilistic Latent Semantic Analysis (PLSA; Hofmann, 1999) as disclosed in U.S. Pat. No. 6,687,696 which is herein incorporated by reference and Latent Dirichlet Allocation (LDA, Blei et al. 2003) model objects as combinations of latent variables, or "topics," each of which is a probability distribution over features. In the most common case, the objects are documents and the features are words in the documents, though, for example, the objects could be images and the features visual ones like line orientation (Sivic, et al. 2005). Fitting the parameters of the model involves learning the various distributions with respect to a set of data: the set of topics P(z), their feature distributions P(w|z) and the topics of each object P(z|d). In this preferred embodiment, fitting the parameters of the topic model 1230B comprises the process of tempered expectation-maximization (Hofmann, 1999) for PLSA. In another embodiment, the application of a topic modeling technique would consist of using Markov chain Monte Carlo (MCMC) to train an LDA model (Griffiths et al, 2004).

Although not necessary, the application of these modeling techniques can start with a pre-processing step to normalize the features used across all data sets, and in this embodiment, all documents. In the case of text documents, this pre-processing step may include, but is not limited to, changing word case, translating words from different languages, stemming words to their root and converting all words and multi-word terms to a numerical index value. In this step 1230B, one topic model can be created from all the provided data or multiple topic models can be created from subsets of the data. For example, one model may consist of only entity data, and another model may consist of only mission data. It is also contemplated that model techniques can also create topic models from related data objects that are neither mission data nor entity data, such as a large pool of resumes, or job listings, standardized job descriptions such as the U.S. Department of Labor's Occupational Information Network, historical missions, or large data or document collections such as the articles in Wikipedia. Similar pre-processing and feature extraction could occur with these data objects as well before producing a topic model.

Apply Interaction Measures

At step 1230A of FIG. 12, interaction measures are applied to the data objects such as entities and mission data. As described above, the interaction measures are generally attributes reflecting the data objects interaction with each other and their ability or inability to co-exist. Using the example of individuals, interaction measures would be the attributes of individuals and groups related to teamwork and working together. Examples of definitions of several symbols and measurement components in relation to the data are shown in FIG. 9. This data is able to provide individual measures, some of which are shown in FIGS. 10 and 11. These individual measures can be used to derive the interaction measures discussed below. In the discussion below, and discussion of teamwork and interaction in this description, an entity is typically, but not always described as a person or a client. Some of these measures represent measures of individuals, some represent measures of groups of individuals and some represent both.

One type of interaction measure includes Centrality Measures. Centrality measures can comprise measures such as Project Communications Inclusiveness, Social Communications Inclusiveness and Project Dominance.

Project Communications Inclusiveness generally describes the degree to which person i receives exclusive communications from other team members on a project. We base this centrality measure on the function $T^\pi(i,j)$ which is a measure of the exclusivity of email communications from person i to person j. For a given person i, we calculate this value with every member of the project normalized by the total exclusivity value of that member with all other team members. Finally, we normalize by the number of team members.

$$C_P^\pi(i) = \frac{\sum_{j \in M^\pi,\ j \neq i} \left[ \frac{T^\pi(j, i)}{\sum_{k \in M^\pi,\ k \neq j} T^\pi(j, k)} \right]}{\sum_{j \in M^\pi,\ j \neq i} 1}$$

$$= \frac{\sum_{j \in M^\pi, j \neq i} \left[ \frac{T^\pi(j,i)}{\sum_{k \in M^\pi, k \neq j} T^\pi(j,k)} \right]}{|M^\pi| - 1}$$

For example, given a project with three team members, A, B, and C, assume that B sends one email exclusively to A and C sends one email exclusively to A and no other emails occur. Then $C_p^\pi(A)=1, C_p^\pi(B)=0=C_p^\pi(C)$. If B sends 1 email with both A and C as recipients and no other emails occur, then $$C_P^\pi(A) = \frac{1}{4} = C_P^\pi(C), \quad C_P^\pi(B) = 0.$$

From empirical observations, we have noticed that this measure tends to give high centrality to administration staff as opposed to the scientific team. This occurs, we believe, for a number of reasons. First, administration staff regularly post 1 to 2 hours to many different projects during a given month for various duties related to the project. Thus, any email between team members and administration staff, or emails between administration staff are likely to flagged as a project email, even though they may not be related to the project. This is due to our definition of a project email as any email in which the sender and all recipients have charged hours to that project during the month. Additionally, when an email is indeed a project email being sent to the administration staff, it is more likely to have a low number of recipients. For administrative emails related to the project, the sender is likely to only send to one or two members of the admin staff, thus increasing their weights as exclusive email recipients for the project. To counteract these effects, we now weight the email exclusivity value by the percentage of labor hours spent on that project during the month the email was sent. This ensures a higher bias to the scientific members of the team, who are more likely to devote a high percentage of their month to the project.

$$C_P^\pi(i) = \frac{\sum_{j \in M^\pi, j \neq i} \left[ \frac{\tilde{T}^\pi(j,i)}{\sum_{k \in M^\pi, k \neq j} \tilde{T}^\pi(j,k)} \right]}{\sum_{j \in M^\pi, j \neq i} 1}$$

$$= \frac{\sum_{j \in M^\pi, j \neq i} \left[ \frac{\tilde{T}^\pi(j,i)}{\sum_{k \in M^\pi, k \neq j} \tilde{T}^\pi(j,k)} \right]}{|M^\pi| - 1}$$

Social Communications Inclusiveness generally comprises the degree to which person i receives exclusive communications from people not on any of his/her projects. This is calculated similarly to Project Communications Inclusiveness, except now we consider non-project emails from all other employees.

$$C_S(i) = \frac{\sum_{j \in M, j \neq i} \left[ \frac{\hat{T}(j,i)}{\sum_{k \in M, k \neq j} \hat{T}(j,k)} \right]}{\sum_{j \in M, j \neq i} 1}$$

$$= \frac{\sum_{j \in M, j \neq i} \left[ \frac{\hat{T}(j,i)}{\sum_{k \in M, k \neq j} \hat{T}(j,k)} \right]}{|M| - 1}$$

Project Dominance generally comprises the degree to which person i dominates communications within a project. This is calculated by examining the total number of recipients on project emails the person sent out vs. the total number of recipients on emails sent by everyone on the project.

$$C_D^\pi(i) = \frac{F^\pi(i)}{\sum_{j \in M^\pi} F^\pi(j)}$$

For example, if person A sends out 100 emails with 250 total recipients, person B sends out 50 emails with 75 total recipients, and person C sends out 50 emails with 50 total recipients, then their scores will be $$C_D^\pi(A) = \frac{2}{3}, \quad C_D^\pi(B) = \frac{1}{5}, \text{ and, } C_D^\pi(C) = \frac{2}{15}.$$

Note that each of these centrality measures could be extended to include other factors such as person similarity or familiarity. For example, we could weight a persons Project Communications Inclusiveness by the similarity (calculated with PLSA or another source) of the sender and recipient of the email.

Team Synergy Facilitation is an interaction measure that generally describes a measure intended to capture the person's experience in bringing together people who haven't worked together in the past. For a given person, i, we examine all of the past projects that they have managed. At the time that those projects were formed, we calculate the total shared time on all previous projects amongst all pairs of team members. Because we want the Team Synergy Facilitation score to be higher for managers who have historically managed teams with low familiarity, we take the inverse.

$$\Omega(i) = \sum_{\pi \in \Pi_i} \frac{1}{\sum_{j \in M^\pi, j \neq i} \left[ \sum_{k \in M^\pi, k \neq j, i} S_{\tau(\pi)}(i,j) \right]}$$

If we have a project success score, $W(\pi)$ for each project we can use this to weight each project. Thus, projects in which people were very unfamiliar with each other and also had high success will yield the highest TSF values.

$$\Omega^W(i) = \sum_{\pi \in \Pi_i} \frac{W(\pi)}{\sum_{j \in M^\pi, j \neq i} \left[ \sum_{k \in M^\pi, k \neq j, i} S_{\tau(\pi)}(i,j) \right]}$$

Additionally, we can calculate a similar measure using communications as indicators of familiarity instead of or in addition to shared time on previous projects.

Conflict Management is an interaction measure intended to capture the person's experience in resolving potential disputes among team members. For a person, i, we examine each project that they have managed in the past. For each of these projects, we calculate the dissimilarity between each pair of team members and normalize that against a completely dissimilar team. This type of similarity can be found in different ways; we'll assume for now this is derived from PLSA. This gives a value of how diverse the team is. We assume highly diverse teams will potentially have more conflict and thus give the manager a higher score on this measure.

$$\Phi(i) = \sum_{\pi \in \Pi_i} \frac{\sum_{j \in M^\pi} \left[ \sum_{k \in M^\pi, \ k \neq j} (1 - \Theta(j,k)) \right]}{\sum_{j \in M^\pi} \left[ \sum_{k \in M^\pi, \ k \neq j} 1 \right]}$$

$$= \sum_{\pi \in \Pi_i} \frac{\sum_{j \in M^\pi} \left[ \sum_{k \in M^\pi, \ k \neq j} (1 - \Theta(j,k)) \right]}{|M^\pi|(|M^\pi| - 1)}$$

We can also weight this calculation by assuming people that have worked together more in the past will have less conflict. Here we weight the dissimilarity by familiarity in shared time on past projects.

$$\Phi^S(i) = \sum_{\pi \in \Pi_i} \frac{\sum_{j \in M^\pi} \left[ \sum_{k \in M^\pi, \ k \neq j} \left[ \frac{(1 - \Theta(j,k))}{S_{\tau(\pi)}(i,j)} \right] \right]}{\sum_{j \in M^\pi} \left[ \sum_{k \in M^\pi, \ k \neq j} 1 \right]}$$

$$= \sum_{\pi \in \Pi_i} \frac{\sum_{j \in M^\pi} \left[ \sum_{k \in M^\pi, \ k \neq j} \left[ \frac{(1 - \Theta(j,k))}{S_{\tau(\pi)}(i,j)} \right] \right]}{|M^\pi|(|M^\pi| - 1)}$$

Indeed, we can use communications as measures of familiarity instead of or in addition to shared time on past projects.

An Adaptability interaction measure of a team or individual is defined by their previous successful performance on adaptive tasks. In this context, we will measure adaptability in the following ways:

(1) Average distance across topics for all their projects. That is, we create a topic-model based on the summaries of each project and measure the average distance in the topic vector space between all the projects a given person has worked on. The hypothesis is that a person that works on a highly varied set of projects is more adaptable than a person who works on a small set of similar projects.

$$A_i^1 = \frac{\sum_{\pi_j, \pi_k \in \Pi_i, \ j \neq k} d(\pi_j, \pi_k)}{\sum_{j,k \in \Pi_i, \ j \neq k} 1}$$

(2) Average variance of customers is another measure. For the projects a person has worked on, we examine the customers and the funding agencies. A person who works for many different customers or agencies will have higher adaptability, we hypothesize, than a person who works on projects for a small set of customers or agencies.

$$A_i^2 = P_{\alpha,\beta}(|C_i|)$$

(3) The number of topics for which a person has a high probability is another measure. Using a topic-model based on individual biographies and resumes, we measure the number of topics for which a person scores a high probability, and normalize this against an average. The hypothesis is that a person who has background in a variety of disciplines will be more adaptable than a person who specializes in a small number of disciplines.

$$A_i^3 = P_{\alpha,\beta}(N(T_i > \tau))$$

For a team, we can calculate the adaptability of each individual using the above measures and then compute the team's overall adaptability (for example as an average, the minimum, or maximum of team members' adaptability scores).

Mission Type Experience is an interaction measure. For a given mission, we calculate the number of hours each team member has worked on missions of the same type. For example, if it is a proposal mission, we find the number of hours each individual has spent writing proposals. For a project mission, we calculate the number of billable hours a person has charged. If more specific information is available, such as individual task roles, we can calculate individuals' experience in each role.

Client Experience is another interaction measure. Assuming that the client is specified for a mission, we define client experience as the maximum experience working with that client in the past over all team members. Specifically, $$\Gamma = \max(\Gamma_i) = \max(P_{\alpha,\beta}(N(\pi \in \Pi_i \ni C_\pi = C)))$$

Communication Based Team Work Conflict (CBTWC) is an interaction measure generally defined as the conflict a team can expect to experience based on the previous quantity of work-related communications team members have shared. To calculate this measure we first calculate the weighted quantity of work-related email communications between each pair of team members prior to the project start date (i.e. $C_D^W(i,j)$). This is calculated for each month; we look at the projects in which both team individuals charged hours and calculate the quantity of emails from one person to another weighted inversely by the number of recipients on each email. We then apply the logistic function to this value to normalize it. We finally average this value for each month. To calculate the final CBTWC measure, then, we take the inverse sum of the above values for each pair of team members and multiply by the total number of team member pairs we are calculating. This gives a normalized value between 0 and 1, where teams with members who have had frequent work-related communications in the past, will have lower communication-based team work conflict.

$$C_D^W(i,j) = \frac{\sum_{m \in M < D} P_{\alpha,\beta} \left( \sum_{e_i^\pi \in E_m^\pi, \ j \in R(e_i^\pi)} \frac{1}{N(e_i^\pi)} + \sum_{e_j^\pi \in E_m^\pi, \ i \in R(e_j^\pi)} \frac{1}{N(e_j^\pi)} \right)}{|M|}$$

$$CBTWC = \frac{\binom{|M|}{2}}{\sum_{i,j, \ i \neq j} C_D^W(i,j)}$$

Furthermore, we can refine this measure by taking into account the number of hours each person worked on a project in the month in which each email was sent. This will give us a weight for each email of the "likelihood" that the email is related to a specific project. For example, if both people worked 100% of their hours in a given month on the same project(s), then emails sent between the two are likely to relate to that project. If the sender spent 20% of her time on a project(s) and the recipient spent 80% of his time on the same project(s), then we expect a lower probability that the email is related to one of those projects. We will use the maximum percentage of time spend to common projects as the weight. So in the previous example, the weight would be 0.8.

Communication Based Team Social Conflict (CBTSC) is an interaction measure generally defined in a similar manner to CBTWC. Here we are concerned with non-project specific emails that team members have sent to each other in the past. Our hypothesis is that teams in which members have communicated frequently in the past on non-project related items will have less social conflict. We define non-project emails to be emails sent between two individuals when those individuals did not charge time to any of the same projects for that month. Again we calculate the bulk of email between each team member (relative to the number of recipients) and normalize with the logistic function. The remaining calculations are the same as CBTWC.

Time based Team Work Conflict is an interaction measure generally defined as the degree of conflict a team can expect to experience based on the number of hours team members have worked on projects together in the past. For any two team members we take the sum of previously shared project hours, ST (i, j) and normalize using a logistic function. We calculate and combine this for every pair of team members and again normalize.

Spatiotemporal Based Team Work Conflict (STBTWC) is an interaction measure generally defined as the degree of conflict a team can expect to experience based on the distributedness of the team and team members' past experience working on distributed teams. It is calculated much in the way as TBTWC, except now we take into account a measure of team distributedness for each of the teams a person has worked on in the past.

Document Based Intellectual Conflict is an interaction measure generally defined as the degree of conflict a team can expect to experience based on the functional similarity of the team members. We hypothesize that teams with highly diverse individuals will experience greater cognitive conflict. The similarity between individuals is based on biographical documents (e.g. resumes, bios, etc.) processed through the means as described in the Background section.

It is also understood that some interaction measures can determine attributes of the team. The overall interaction skills/attributes of the group can be assessed through analysis of the individual teamwork skills described above. For example, to determine the overall familiarity of a given team, we assess the familiarity between team members as described earlier, and aggregate this into an overall team measure. When presented with a set of individuals forming a novel team, we can calculate the expected conflict that team will have in a similar manner to the above measure of conflict management. In particular, for a new team, we can calculate the similarity between all the team members using the aforementioned formulas to arrive at a measure of conflict for the team.

We also introduce the notion of "compensatory measures." That is, for a given assessment of a team's teamwork skills, we assess the ability of individuals to compensate for skills that are deficient. If a given team is forecasted to likely have a high degree of conflict, we can compensate by finding team members (or by searching for additional members to add to the team) which have a high degree of conflict management, as calculated here. Thus, we can hope to mitigate any potential conflict by selecting an individual or individuals with skills in managing that conflict. Indeed, this same compensatory technique can be used with other measures, such as placing a team member with high Team Synergy Facilitation on a team with low familiarity. In this manner, we may make better comparisons between teams that have high teamwork skills and teams that may have low skills, but have individuals who can compensate.

Group Entities

Figure 4:
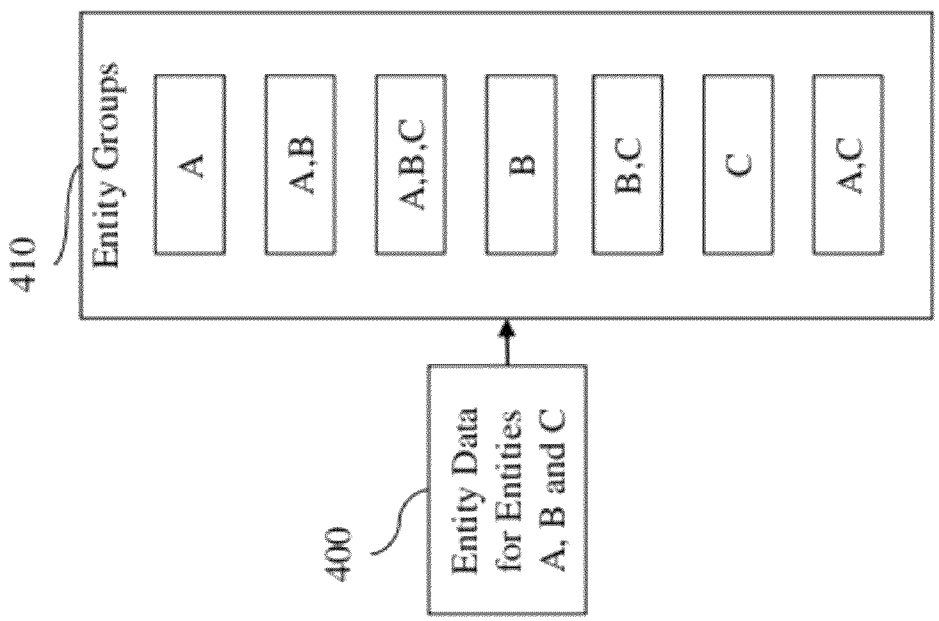
FIG. 4 is a graphic showing the groupings of entities in one embodiment of this invention.

After the creation of the topic models and application of the interaction measures if used, the data object (entities) are represented in all possible grouping of data objects (entities) in steps 1240A and 1240B. An example of this grouping is shown in FIG. 4 where the entity data 400 for three entities A, B and C is grouped as all possible sets (the power set) of entities 410 from the pool of entity data 400.

Apply Similarity Metric

Referring again to FIG. 12, the next steps of this method comprise applying a similarity metric to determine both the similarity between a first data object and a group of second data objects and the mutual similarity of the second data objects. In the embodiment shown, this comprises applying the similarity metric to determine both the similarity between entities in groups 1242B and the similarity between each group of entities and the mission 1244B.

In this embodiment, when using a topic model technique such as PLSA or LDA, a similarity metric between two objects (e.g., an entity and a mission) can be the probability of the mission (M) given the entity (E), via the latent topics (z):

$$P(M \mid E) = \sum_z P(M \mid z) P(z \mid E)$$

Where the mission and entity are represented by their associated documents and some document types may have different weights.

Other methods of similarity may project the topic profile (P(z|E) for all z) of both the mission and the entity into a single topic space and use the cosine between the two vectors as the measure of similarity. Yet another method of measuring similarity may be the sum of differences (or squared differences) between the mission P(z|M) and entity P(z|E) across all topics.

If multiple topic models are created, then each topic model may have its own similarity metric, and the overall similarity between two objects could be the sum, average or other statistical measure of the individual similarity metrics.

In this embodiment, two similarity measures are determined for each entity group formed from step 1240B. The first measure is the group to mission similarity 1244B which represents the similarity of a mission to that group of entities, as a whole or as a sum of individual entities. In this embodiment, all documents associated with all of the entities are used to determine the similarity to the documents associated with the mission. In other embodiments, the similarity between individual entities and the mission are all obtained and then combined. The second measure obtained for every group from step 1240B is the mutual similarity of entities in groups 1242B. The mutual similarity of entities in groups 1242B is defined as the sum, or other statistical combination, of the similarity of every member of the group with all other members of that group. A group with just one member has a mutual similarity of zero.

Apply Appropriateness Metric

Referring to FIG. 12, the next steps of this method comprise applying at least one appropriateness metric to determine appropriateness such as a group appropriateness of a first data object to a group of second data objects and a mutual appropriateness of the second data objects to each other. These appropriateness metrics reflect those types of data object attributes related to the interaction measures.

In the embodiment of FIG. 12, this step comprises applying appropriateness metrics to determine both the mutual appropriateness of the entities in groups 1242A and the group appropriateness of each group of entities to the mission 1244A. These metrics are used to assess if the group has the appropriate teamwork skills, (if dealing with people) or the appropriate interaction patterns (broadly). In 1242A, the mutual appropriateness of the entities is determined. A mutual appropriateness metric combines the values of the interaction metrics for each entity. Each entity may be represented by a vector comprised of its interaction metrics. One mutual appropriateness metric may take the standard deviation of the entities in this vector space, such that those groups with a greater spread of values are better. Another mutual appropriateness metric would weight groups that have one entity with a high number of standard deviations away from the mean. Such a metric would weight groups that have, for example, only one entity with a high leadership-related interaction metric (e.g., Project Dominance).

In 1244A, the group appropriateness of the group as a whole for the mission is determined. For example, using the matrix of theoretical weights of mission attributes to teamwork skills required, it may be the case that the mission must be done quickly and require a great deal of creativity. The first requirement would give more weight to groups of entities with greater familiarity/less conflict which could be measured by the Communication Based Team Work Conflict (CBTWC) measure. The requirement of creativity might require an intellectually diverse group of people who might therefore have a high degree of Document Based Intellectual Conflict (DBIC). To the extent that a group is high on one of these conflict measures, the group is compensated if it has a member who has a high degree of Conflict Management skills for these conflicts, based their experience managing previously successful teams who had such conflicts. Groups are then rated by the weighted some of these CBTWC and the DBIC values.

The overall appropriateness metric A then is the sum of the weighted group (G) and mutual appropriateness (M) metrics: $A = \Sigma g_i G_i + \Sigma m_j M_j$. Given the examples above, the weights ($g_i$) would be negative (indicating less conflict is better) and the weights ($m_j$) would be positive (indicating groups with more unique individuals are better).

Determine Optimal Selection of Groups of Entities to Missions

With the similarity determinations from steps 1242B and 1244B, and appropriateness determinations from steps 1242A and 1233A if used, step 1250 can determine the optimal selection of groups of data objects to satisfy other data objects.

In this embodiment, where one data object reflects a mission and other data objects reflect entities, for each group of entities from step 1240B, the group to mission similarity 1244B is compared to the mutual similarity of entities to groups 1242B to determine the optimal selection of groups of entities to missions 1250. In this embodiment, the determination results from seeking to maximize the group-mission similarity, but minimize the mutual similarity. Such a comparison, would, for example, be effective for determining the minimum spanning set, or the minimum number of entities required to fulfill the mission; that is, a new entity is added to a group only insofar as the additional entity fulfills more of the unfulfilled requirements of the mission than has similarity to other entities already in the group. The result of this embodiment is a ranking of all possible sets of entities as they compare to the requirements and constraints of a mission.

Other comparisons are also possible to determine the optimal grouping of entities to mission. Recognizing the possibility of additional data types as shown in FIGS. 2 and 3, the structured data of the entities and the mission could also be compared such that specific requirements are met. In one embodiment, the mission may have a requirement for a person with a Ph.D., in which case the structured data for at least one member of the group must have a Ph.D. The constraints of the mission and of the entity pool could also be compared. In one embodiment, the mission may have a budget constraint which would be compared to the sum of the salaries required for the employees in each group. Together, the three comparisons can be combined to create a single ranking of the entity groups most appropriate for the mission as described by the unstructured data, fulfill the requirements as defined by the structured data, and yet comply with all of the constraints.

A further result of this embodiment is a score of mutual similarity for all possible sets that minimizes or maximizes the number of entities, and/or minimizes or maximizes the mutual similarity or any other measure of the set, and the associated scores that could be further processed.

In another embodiment, if multiple missions and entities are provided, a power set of the entities are compared to all the mission data and for each mission, the highest ranking set of entities is determined, and the missions are in turn ranked by the score of the highest ranking set. The result of this embodiment is a ranking of missions by the appropriateness of any set of entities, and the associated scores that could be further processed.

Further recognizing the data types shown in FIGS. 2 and 3, the three comparison types described above may be weighted, or have veto-like power of the other types for allowing, disallowing, or re-ranking groups. In addition, the order of these operations may be changed and intermixed with the determining of which groups from step 1240B proceed to have the mutual similarity and group-mission similarity even calculated. Other information may be used in this step to add biases, preferences, or weighting based on other aspects of the set of entities or of the mission.

When interaction attributes and appropriateness are considered, such as through steps 1210A-1242A, the overall ranking of data objects can be enhanced. For example, the overall ranking of teams can be enhanced by bringing together the assessment of both taskwork and teamwork skills, along with attributes of the mission. Once a candidate team has been formed, we can measure both the taskwork and teamwork skills for that team. Measures of teamwork skills, as described above, would include any compensatory measurements. In this manner, we arrive at a set of values for a given team. To derive an overall ranking for that team, we then assess the relative importance of each of the skills based on the mission attributes, as described above. This allows us to present to the user the team which best fits the mission, based on both their ability to fulfill the technical requirements and their ability to work well together given the requirements of the mission.

As can be seen, FIG. 12 illustrates one example of taking the results of an appropriateness analysis as well as the similarity analysis as input to determine the optimal selection of groups of entities to missions.

Specific algorithms are described in this embodiment; however the invention is not limited to these methods of comparison. Any methodology of comparing and ranking data sets can be used to determine the appropriateness of the group of entities to the mission requirements.

Communicate Results

The results of step 1250 are represented or otherwise communicated in step 1260. These results may be presented to a user through a computer's graphical user interface or it may be communicated or represented to another process, such as a computer-based process, for further processing.

In this embodiment, the results are displayed to a user through the graphical user interface of a computer which allows the user to manipulate the mission requirements, even going so far as to making a requirement the inclusion or exclusion of a particular entity. The user might also wish to change the constraints to determine if the optimal group changes. For example, in one embodiment, the user might alter a constraint, such as reducing the budget to see if a group of entities still exists from the entity pool that is within budget but can still achieve the mission. Any number of re-rankings or requirement and constraint manipulation are envisioned in the present invention.

Operational Example of One Embodiment of the Invention:

The present invention is further illustrated by, but by no means limited to, the following description of the operation of the above embodiment of the invention within a computer based system. Following the steps shown in FIG. 1, this example illustrates PLSA being used to quantify the extent to which a group of candidates matches the requirements of a task, with the goal of finding the minimal spanning set (MSS) of entities that matches the mission. Thus, the entities here are candidates and the mission is a task. The results of this specific implementation of the process are graphically illustrated in FIG. 5

In this embodiment nine entities were provided, step 120, as represented by individual candidates A, B, C, D, E, F, G, and H. The candidates are represented by data objects comprising electronic documents describing their skills and might include work history in the form of a resume. Task data was provided, step 120, as represented by a data object comprising a description of a new user interface that helps managers to organize their time according to the latest methods.

The parameters of a PLSA topic model are fitted to a large corpus of mission descriptions. The probability of the topics given the current task description indicate that four topics are most probable. Observing the most probable words in these four topics, they are labeled: Design, Management, Research, and Software.

Figure 5:
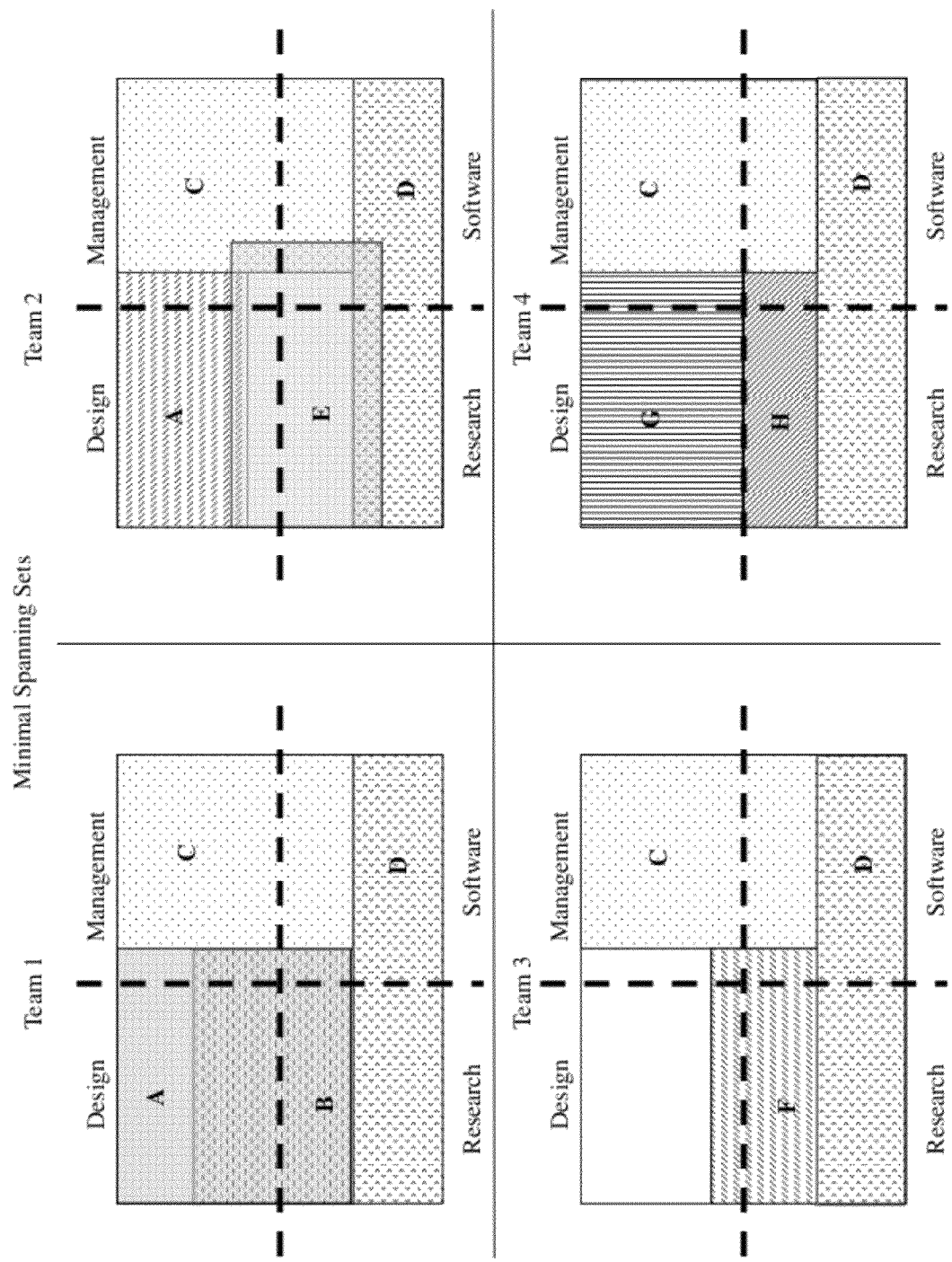
FIG. 5 is a graphic representation of the results of one embodiment of this invention.

The overall square in each of the four graphics of FIG. 5 illustrates visually the "space" of the requirements from the task description provided. The four quadrants of the square then represent 100% of the labeled topic probability.

Based on applying the PLSA topic model technique to the documents associated with individual candidates, step 130, each candidate is shown to cover a mission quadrant insofar as the probability of the topic given the candidates' data approaches the probability of the topic given the mission description.

For simplicity purposes, for step 140, the grouping of entities is limited to four groups of entities in FIG. 5. Team 1 consists of four members: A, B, C and D. Team 2 consists of A, C, D, and E. Team 3 consists of only 3 members: C, D and F. Team 4 consists of 4 members G, C, D and H.

Once the entities are grouped, the similarity metric is applied. Applying the group to mission similarity, step 144, is graphically shown as the ability of the group of entities to cover the requirements of the mission as represented by the "space" within the square. Applying the mutual similarity of entities in groups, step 142, is graphically shown as the space between, or the overlap of entities in the square. A space represents a gap in team skills when compared to the mission. An overlap with another entity represents an overlap in skill sets within that team.

Given the similarities, each of the four groups is then analyzed to determine optimal selection of groups of entities to missions, step 150. In this embodiment, the optimal selection of group of entities to missions is a group of entities that fills all aspects of the mission with the fewest possible entities: the minimal spanning set. In this embodiment, the determination of the optimal selection group is visual. As can be seen with team 1, the mission is covered, however candidate B completely overlaps with Candidate A, thus this is not a minimal spanning set. With team 2, candidate E, while not completely overlapping with the skills of the other three, does have some redundancy with them. With team 3, while there is no overlap among the team members, this team cannot fulfill all the aspects of the mission, so it is not the best team. With team 4, this team fills all the skills required of the mission, and has no overlap, that is the mutual similarity is zero, so this is a minimal spanning team.

An additional team could also be considered. For example, Team 1 could be considered without candidate B. This team would also be a minimal spanning team. However, since candidate A would be required to do four different kinds of jobs, this team may need more time to accomplish the mission than Team 4, where no candidate has more than two jobs. This may be a constraint comparison that could interact with the similarity comparison.

Other constraints might also be incorporated from social network analysis or mission data, such as the need for a clear leader and only candidate A has a high "centrality"; or perhaps historical data indicate that when candidates B and C are together on a team that the mission has a tendency to fail and thus should not be on the same team. Other constraints may apply any number of the Interaction Measures as well.

In any case, the Minimal Spanning Set score will allow users to understand what the trade-offs may be and incorporate them numerically with other aspects of the team and mission via Interaction Measures.

The results in this embodiment are communicated or represented, step 160, in FIG. 5 as a two dimensional graphic that can be used to select the optimal selection group. It is understood that in similar situations with more complicated missions or more candidates, the determination of the optimal selection of groups of entities to missions can be made with the assistance of algorithms that calculate entities that maximize a fit with the mission and also calculate the minimum overlap between entities.

Testing Results of One Embodiment of the Methods to Compare Data Objects:

A test of one embodiment of the methods disclosed was run by Aptima, Inc. utilizing 142 Requests for Proposals (RFPs)

from a recent solicitation from Department of Defense Small Business Innovation Research program. Of these, 25 were chosen by Aptima's management as being relevant to their work and 117 were rejected. Ten RFPs were subsequently responded to, and 4 were won.

Referring to FIG. 1, the RFPs represented the mission data, which are generally one page single spaced. The entity data was represented by 185 biographies (typically 1-2 paragraphs) of current and previous Aptima employees and consultants. Both the RFPs and the biographies were analyzed with the PLSA technique using a 40-topic model. That is, each biography and RFP, plus an additional 327 RFPs from a previous round, were treated as documents, pre-processed to normalize the terms, and the ensuing set of terms and documents used as input to fit the parameters of a forty topic model. Table 1 below illustrates the top ten most probable features from four of the topics in the model, in this case the features are words and their stems (e.g., materials, material, and materialization, would all be stemmed to "materi"). Even with this small amount of data some very clear topics emerge, e.g., Topic 10 is about composite materials for making parachutes and Topic 16 is about game-based training of cultural behaviors and interactions.

TABLE 1

| Topic 10 | Topic 12 | Topic 16 | Topic 37 |
| --- | --- | --- | --- |
| Materi | Health | Cultur | Human |
| Composit | Medic | Cultural | Factors |
| Materials | Diseas | Train | Factor |
| Composite | Care | Game | Design |
| Parachut | Clinic | Training | Interaction |
| Polym | Medical | Behaviors | Interfac |
| Textil | Clinical | Interactions | Interact |
| Composites | Blood | Behavior | Usabl |
| Fiber | Food | Cultures | Usability |
| Parachute | Ahlta | Interact | interface |

For the similarity comparisons, the concept of a minimal spanning set described above was used. For the group to mission similarity, the sum of the probabilities of each team member matching the RFP was used; and for the mutual similarity of entities to groups, the sum of the probabilities of all combinations of one employee bio generating another was used. The team's score of being a minimal spanning set (MSS) was calculated by subtracting the mutual similarity from the group-mission similarity:

$$MSS_{E_{11}\ldots N} = \sum_n P(RFP | E_n) - \sum_{i \neq j} \sum_j P(E_i | E_j)$$

For each RFP, groups consisting of 2-5 people (not the entire power set due the constraint that more than 5 people is unaffordable) from the 10 people most similar to the RFP were examined. This was done to reduce processing time, but is not necessary to the invention. The MSS of the team with the maximum score was used to compare the sets of RFPs: Rejected, Chosen, Submitted, and Won.

Figure 6:
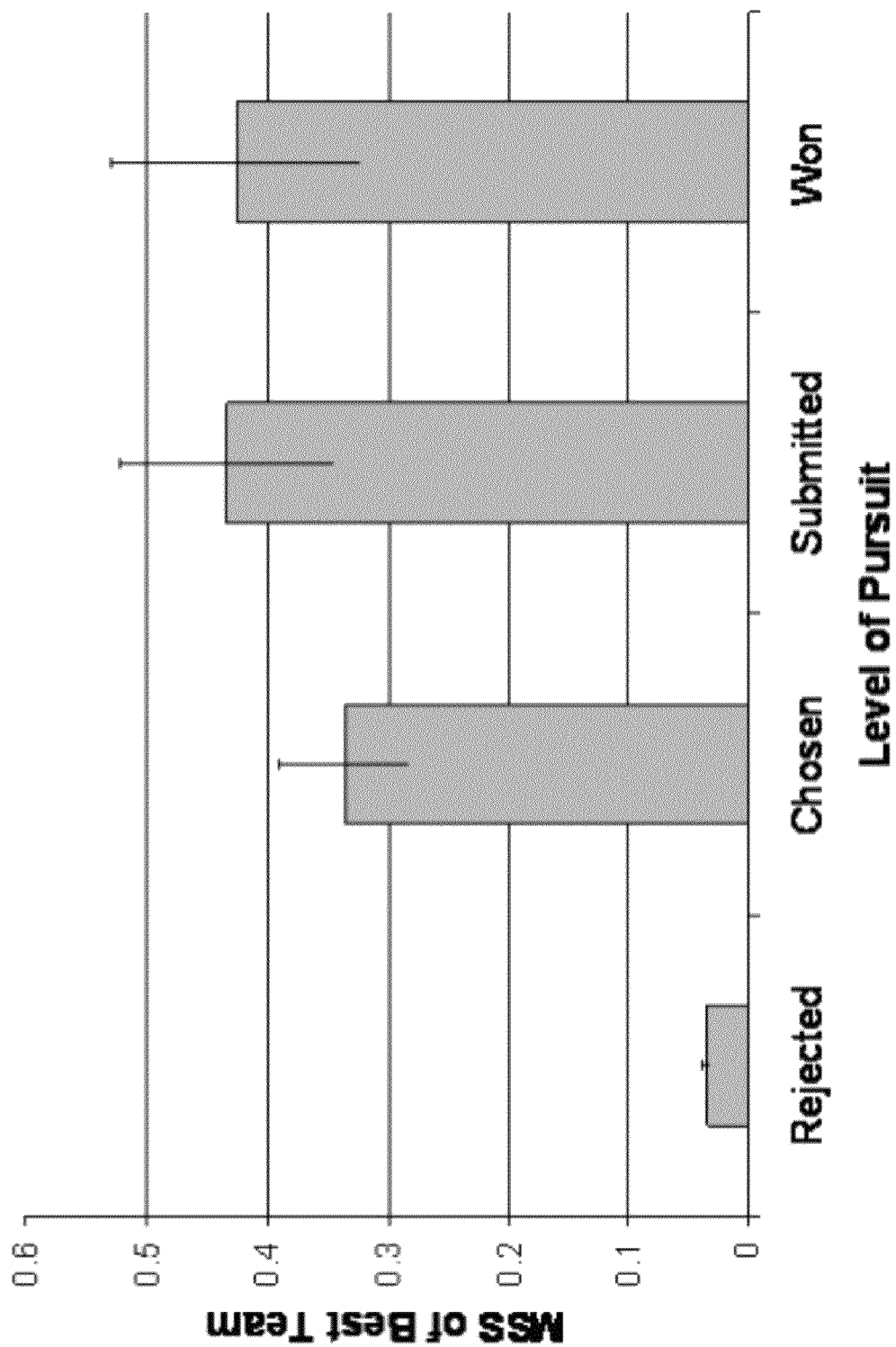
FIG. 6 is a graphic representation of the result of a test of one embodiment of this invention.

The results shown in the FIG. 6 indicate that the present invention is capable of automatically determining which RFPs the company should respond to and those they are most likely to win. Especially in the case of management choosing to submit a proposal or not for an RFP, one might consider this automatic process as mimicking the process of management: reading the RFP, getting a "gist" of what is about, then comparing that to the gist of skills present at the company.

Alternative Embodiments Of The Invention:

Although the embodiments described above include implementations of PLSA and LDA as topic model techniques, it is recognized that any number of a range of topic modeling techniques may be used for determining that a set of entities may achieve the mission, or have a certain similarity (or alternatively dissimilarity) amongst themselves. These other techniques may include, but are not limited to, any means for measuring the similarity of data representing the entities and the mission. Various forms of latent variable methods, such as Latent Semantic Analysis (LSA), independent components analysis (ICA), or any other means of measuring the similarity of documents could be used for both determining the ability of a set of entities to achieve a task, and determining the overall overlap, or mutual similarity of a group of entities. Additionally, the utilization of topic models to images and other graphic data are contemplated in alternative embodiments of this invention. Known improvements to all of the contemplated modeling techniques, such as to simultaneously extract other features of the documents, such as syntax via hidden Markov models (Griffiths, et al., 2004) or collocations (Griffiths et al., 2007), and any other improvements are also envisioned to fall within this invention. Additionally, the results of non-simultaneous methods of feature extraction, and improvements to feature extraction methods, are also envisioned, such as various techniques of information extraction (e.g., Appelt & Israel, 1999).

In one embodiment, as compared to the embodiment shown in FIG. 1, it is also contemplated that the group to mission similarity, step 144, is not performed and only the mutual similarity for each group of entities, step 142, is considered. Although not necessary, this embodiment can be further enhanced by allowing elements shown in FIG. 3, such as structured entity data 320 and entity constraints 330 to be used for ranking and eliminating groups 140 from consideration. These constraints might minimize, or maximize, the number of entities, or any other measure of the group as a whole, for a given mutual similarity value.

In another embodiment, the methods shown in FIG. 1 have an additional step of feature extraction performed with methods similar to the application of the topic modeling technique 130. This feature extraction is based on the concept that the words in a topic model are merely features, thus other features may be added to the set of features for any given document. Feature extraction could be based on using a different topic model that additionally extracts collocations (Griffiths et al., 2007) or Hidden Markov Models (Griffiths et al, 2004). Other features of the documents may include author, or source, document citations, or other metadata associated with the documents. Other features may be derived by means of information extraction such as entity, relationship, or event extraction as tested by the Automatic Content Extraction program (http://www.nist.gov/speech/tests/ace/) or simpler semantic role labeling (Palmer et al., 2005). The results of parsing the sentences in the documents into "trees" (Markus et al., 1993) could also be added as features of the document.

As mentioned above, other embodiments may include adding the structured aspects of the data associated with a mission or entity as features to all documents associated with a mission or entity.

Any of a number of standard methods may also be used to pre-process the data as part of the topic modeling technique. These pre-processing methods may include stemming, changing case, translating from one language to another, or reducing synonyms to a single term.

Other embodiments may be created in domains where optimum similarity is defined as minimizing similarity. For example, one might want to maximize the diversity of students accepted at a college, or the companies, or funds, in a fund. Documents and data representative of the students (e.g., college application materials) or of the companies (e.g., annual reports, or 10 Ks), or of the funds (e.g., prospectuses) would be analyzed via the topic model to determine the mutual similarity of all possible sets of entity documents. From the power set, groups of entities could be ranked, such that the highest ranked groups had the least mutual similarity, but perhaps had the largest total number of entities. The mutual similarity of these sets could also be compared to the group to mission similarity where the mission is described by various documents such as the teaching interests (e.g., journal papers) of the college faculty.

It is understood that some embodiments of the invention may treat a single mission within a larger set of missions, or a mission may have tasks and sub-tasks requiring different sets of entities to accomplish those tasks. In this case, the outputs of the determination of the optimal selection of groups of entities to missions may be further constrained to achieve an overall optimum assignment of entities to missions across a superset of all missions, tasks, and sub-tasks. For example, consider two missions, Mission 1 and Mission 2, and 6 entities, A-F. Individually, the optimal selection of groups of entities for Mission 1 might be A, B, and C; and for Mission 2, C, D, E. However, since some embodiments may not allow C to take part in two missions simultaneously, the goal now is to determine which mission C should partake in, and in which mission should F substitute for C. This could be determined, for example, by summing the scores for both Missions 1 and 2, for only those groups of entities where no entity is used for both missions. Similarly, tasks and sub-tasks might require continuity of entities, such that the optimal assignment of entities to missions uses the sum of scores across missions for only those groups in which an entity is assigned to all or some of the sub-tasks.

One Embodiment of a Processor-Based System to Compare Data Objects:

Embodiments of the processor-based system to compare data objects can be implemented by a computer executing a sequence of program instructions for carrying out the steps of the methods, assuming all required data for processing is accessible to the computer, which sequence of program instructions may be embodied in a computer program product comprising media storing the program instructions. One example of a processor-based system to compare data objects is depicted in FIG. 13 herein by which the method of the present invention may be carried out. The system includes a processing unit, which houses a processor, memory and other systems components that implement a general purpose processing system or computer that may execute a computer program product comprising a computer readable medium or media, for example a compact storage medium such as a compact disc, which may be read by processing unit through disc drive, or any means known to the skilled artisan for providing the computer program product to the general purpose processing system for execution thereby.

The program product may also be stored on hard disk drives within processing unit or may be located on a remote system such as a server, coupled to processing unit, via a network interface, such as an Ethernet interface. The monitor, mouse and keyboard can be coupled to processing unit through an input receiver or an output transmitter, to provide user interaction. The scanner and printer can be provided for document input and output. The printer can be coupled to processing unit via a network connection and may be coupled directly to the processing unit. The scanner can be coupled to processing unit directly but it should be understood that peripherals may be network coupled or direct coupled without affecting the ability of workstation computer to perform the method of the invention.

As will be readily apparent to those skilled in the art, the present invention can be realized in hardware, software, or a combination of hardware and software. Any kind of processor based computer/server system(s), or other apparatus adapted for carrying out the methods described herein, is suited. A typical combination of hardware and software could be a general-purpose computer system with a computer program that, when loaded and executed, carries out the respective methods described herein. Alternatively, a specific use computer, containing specialized hardware or software for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or reproduction in a different material form.

FIG. 13 is a schematic diagram of one embodiment of a computer system 1300 that can be used for the operations described in association with any of the processor-based methods described herein. The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display information for a user interface on the input/output device 1340.

The memory 1320 stores information within the system 1300. In some implementations, the memory 1320 is a computer-readable storage medium. In one implementation, the memory 1320 is a volatile memory unit. In another implementation, the memory 1320 is a non-volatile memory unit.

The storage device 1330 is capable of providing mass storage for the system 1300. In some implementation, the storage device 1330 is a computer-readable storage medium. In various different implementations, the storage device 1330 may be a floppy disk device, a hard disk device, an optical disk device, or a tape device.

The input/output device 1340 provides input/output operations for the system 1300 and may be in communication with a user interface 1340A as shown. In one implementation, the input/output device 1340 includes a keyboard and/or pointing device. In another implementation, the input/output device 1340 includes a display unit for displaying graphical user interfaces.

The features described can be implemented in digital electronic circuitry, or in computer hardware, firmware, software, or in combinations of them such as but not limited to digital phone, cellular phones, laptop computers, desktop computers, digital assistants, servers or server/client systems. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) or Plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

It is understood that some embodiments of the present invention will allow users to interact with the system to impose additional constraints and requirements for a mission and teams. For a given mission, the user may have additional knowledge about the mission which is not represented in the mission description. This may include, but is not limited to knowledge about mission attributes and knowledge about required or unavailable team members. The user may interact with the system to update the attributes of a given mission, even if those attributes were previously set by automated analysis of the mission description or expert analysis. Similarly, when the list of potential team members is presented to the user, he/she may identify users as required/considered/denied even if the system has already automatically determined the list of potential candidates. If an individual is selected as required, the system will form teams around this candidate which both cover the requisite technical skills, but also comprise individuals with the right mix of teamwork skills.

This invention is not limited to the methods and systems described in the embodiments above. The methods of this invention are easily incorporated into computer systems and data networks that allow certain steps of these methods, such as input and output, to be performed on client machines connected to a computer network while the computational steps and data set storage can be done through a server in a client-server model or other distributed computing architecture. It is also envisioned that the methods can be used over a wireless computer network to include wireless computers, wireless phones or other wireless data network.

With respect to the above description then, it is to be realized that the optimum relationships for the steps and components of this invention, to include variations in acquiring data sets, pre-processing data sets, comparing data sets, ranking results and displaying results are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

What is claimed is:

1. A processor-based method for comparing a plurality of data objects comprising the steps of:
   receiving a first data object;
   receiving a plurality of second data objects;
   applying a topic model technique to the first data object and the plurality of second data objects creating a topic model;
   grouping the plurality of second data objects creating a plurality of groupings;
   the plurality of groupings comprising possible sets of second data objects;
   determining a similarity of the first data object and the plurality of groupings;
   determining an optimal selection of the first data object and the plurality of groupings from the similarity; and
   communicating the optimal selection.

2. The processor-based method of claim 1 wherein the topic model technique comprises Latent Dirichlet Allocation (LDA).

3. The processor-based method of claim 1 wherein the first data object comprises at least one requirement and the plurality of second data objects comprises a plurality of capabilities of a plurality of individuals.

4. The processor-based method of claim 1 wherein the step of determining the optimal selection of the first data object and the plurality of groupings comprises determining a minimal spanning set of the second data objects to maximize the similarity of the first data object and the plurality of groupings.

5. The processor-based method of claim 1 further comprising:
determining an appropriateness of the first data objects and the second data objects; and
determining an optimal selection from the similarity and the appropriateness.

6. The processor-based method of claim 5 further comprising:
receiving at least one third data object;
the step of applying the topic model technique further comprises pre-processing the first data object, the plurality of second data object and the at least one third data object whereby the data objects are normalized; and
applying the topic model technique to the first data object, the plurality of second data objects and the at least one third data object to create the topic model.

7. A processor-based method for comparing a plurality of data objects comprising the steps of:
receiving a first data object;
receiving a plurality of second data objects;
applying a topic model technique to the first data object and the plurality of second data objects creating a topic model;
grouping the plurality of second data objects creating a plurality of groupings;
the plurality of groupings comprising possible sets of second data objects;
determining a first similarity of the first data object and the plurality of groupings;
determining a second similarity of the plurality of second data objects in each of the plurality of groupings;
comparing the first similarity and the second similarity to determine an optimal selection of the first data object and the plurality of groupings; and
communicating the optimal selection.

8. The processor-based method of claim 7 wherein the topic model technique comprises Latent Dirichlet Allocation (LDA).

9. The processor-based method of claim 7 wherein the first data object comprises at least one requirement and the plurality of second data objects comprises a plurality of capabilities of a plurality of individuals.

10. The processor-based method of claim 9 further comprising:
determining an appropriateness for the first data objects and the second data objects; and
the step of comparing the first similarity and the second similarity to determine an optimal selection comprises comparing the first similarity, the second similarity and the appropriateness to determine the optimal selection.

11. The processor-based method of claim 10 further comprising:
receiving at least one third data object;
the step of applying the topic model technique further comprises pre-processing the first data object, the plurality of second data objects and the at least one third data object whereby the data objects are normalized; and
applying the topic model technique to the first data object, the plurality of second data objects and the at least one third data object to create the topic model.

12. A processor-based system for comparing a plurality of data objects comprising the steps of:
means for receiving a first data object;
means for receiving a plurality of second data objects;
means for applying a topic model technique to the first data object and the plurality of second data objects creating a topic model;
means for grouping the plurality of second data objects creating a plurality of groupings;
the plurality of groupings comprising possible sets of second data objects;
means for determining a similarity of the first data object and the plurality of groupings;
means for determining an optimal selection of the first data object and the plurality of groupings from the similarity; and
means for communicating the optimal selection.

13. The system of claim 12 wherein:
the means for receiving a first data object and plurality of second data objects comprises a processor;
the means for applying a topic model technique, the means for grouping the plurality of second data objects, the means for determining a similarity and the means for determining an optimal selection comprises a computer program product in a memory for execution by the processor; and
the means for communicating the optimal selection comprises the processor in communication with a system bus.

14. A computer readable medium having stored thereon a computer program product that, when executed, causes a processor based computer to perform the steps of:
receiving a first data object;
receiving a plurality of second data objects;
applying a topic model technique to the first data object and the plurality of second data objects creating a topic model;
grouping the plurality of second data objects creating a plurality of groupings;
the plurality of groupings comprising possible sets of second data objects;
determining a similarity of the first data object and the plurality of groupings;
determining an optimal selection of the first data object and the plurality of groupings; and
communicating the optimal selection.

15. A processor-based method for comparing a plurality of data object comprising the steps of:
receiving a first data object;
receiving a plurality of second data objects;
applying an interaction measure to the first data object and the plurality of second data objects;
grouping the plurality of second data objects creating a plurality of groupings;

the plurality of groupings comprising possible sets of second data objects;

determining an appropriateness of the first data object and the plurality of groupings;

determining an optimal selection of the first data object and the plurality of groupings from the appropriateness; and communicating the optimal selection.

16. The processor-based method of claim 15 wherein the plurality of second data objects comprises a plurality of attributes of a plurality of individuals.

17. The processor-based method of claim 15 wherein the plurality of second data objects comprises a plurality of attributes of a plurality of individuals and at least one of the plurality of attributes comprises an interaction attribute.

18. The processor-based method of claim 15 wherein:
the step of determining the optimal selection comprises determining the optimal selection from a group appropriateness and a mutual appropriateness.

19. The processor-based method of claim 15 wherein:
the step of determining the appropriateness of the first data object and the plurality of groupings comprises applying a first appropriateness metric to determine a group appropriateness of the first data object and the plurality of groupings and applying a second appropriateness metric to determine a mutual appropriateness of the second data objects and the plurality of groupings; and
the step of determining the optimal selection comprises determining the optimal selection from the group appropriateness and the mutual appropriateness.

* * * * *